(12) United States Patent
Bhattad et al.

(10) Patent No.: US 12,137,458 B2
(45) Date of Patent: Nov. 5, 2024

(54) CONFIGURED GRANT OPERATION FOR NEW RADIO UNLICENSED SPECTRUM CARRIER AGGREGATION

(71) Applicant: QUALCOMM Incorporated, San Diego, CA (US)

(72) Inventors: Kapil Bhattad, Bangalore (IN); Tanumay Datta, Bangalore (IN); Ananta Narayanan Thyagarajan, Bangalore (IN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/793,756

(22) Filed: Feb. 18, 2020

(65) Prior Publication Data
US 2020/0275475 A1  Aug. 27, 2020

(30) Foreign Application Priority Data
Feb. 22, 2019  (IN) .............................. 201941007087

(51) Int. Cl.
*H04W 72/23* (2023.01)
*H04W 72/1268* (2023.01)
*H04W 74/08* (2009.01)
*H04W 74/0808* (2024.01)

(52) U.S. Cl.
CPC ....... *H04W 72/23* (2023.01); *H04W 72/1268* (2013.01); *H04W 74/0808* (2013.01)

(58) Field of Classification Search
CPC ............... H04W 72/14; H04W 72/042; H04W 72/1268; H04W 74/0808; H04L 5/001; H04L 1/18; H04L 1/1896; H04L 5/0044; H04L 1/1822; H04L 5/0055
See application file for complete search history.

(56) References Cited

U.S. PATENT DOCUMENTS

2013/0188576 A1* 7/2013 Chao ..................... H04W 72/04
370/329
2016/0242186 A1  8/2016 Nissila
(Continued)

FOREIGN PATENT DOCUMENTS

CN  107925990 A  4/2018
KR  20160086251 A  7/2016

OTHER PUBLICATIONS

Lenovo et al: "HARQ-ACK transmission on unlicensed carriers", 3GPP Draft; R1-1804209, 3rd Generation Partnership Project (3GPP), Mobile Competence Centre ; 650, Route Des Lucioles ; F-06921 Sophia-Antipolis Cedex ; France, RAN WG1, Sanya, China; Apr. 16, 2018-Apr. 20, 2018 Apr. 15, 2018 (Apr. 15, 2018).*
(Continued)

*Primary Examiner* — Peter Chen
(74) *Attorney, Agent, or Firm* — Arent Fox, LLP (57) ABSTRACT

Configured grant operations for new radio (NR) unlicensed spectrum (NR-U) carrier aggregation (CA) are disclosed. In an aspect, a method of wireless communication by a user equipment (UE) may include transmitting uplink (UL) data to a base station according to a configured grant configuration. The method may also include determining a carrier to receive feedback from the base station based on the configured grant configuration. The method may further include receiving feedback from the base station on the carrier in response to the transmitting of the UL data.

18 Claims, 6 Drawing Sheets

(56) References Cited

U.S. PATENT DOCUMENTS

2018/0042043 A1* 2/2018 Babaei .................. H04L 5/0082
2020/0146042 A1* 5/2020 Suzuki .................. H04W 72/20
2020/0221310 A1* 7/2020 Babaei ............. H04L 27/26025
2022/0069950 A1* 3/2022 Nunome ............... H04L 1/1861

OTHER PUBLICATIONS

International Search Report and Written Opinion—PCT/US2020/018855—ISAEPO—dated May 26, 2020.
Lenovo, et al., "HARQ-ACK Transmission on Unlicensed Carners", 3GPP Draft, 3GPP TSG RAN WG1 Meeting #92bis, R1-1804209, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 15, 2018 (Apr. 15, 2018), XP051426497, 3 Pages, Retrieved from the Internet: URL: http://www.3gpp.org/ftp/Meetings%5F3GPP%5FSYNC/RAN1/Docs/, [retrieved on Apr. 15, 2018], Discussion, p. 2, paragraph 2-p. 3.
Qualcomm Incorporated: "Enhancement to Configured Grants in NR Unlicensed", 3GPP Draft, 3GPP TSG RAN WG1 Meeting #96, R1-1902988 7.2.2.2.4 Enhancements to Configured Grants for NR-U, 3rd Generation Partnership Project (3GPP), Mobile Competence Centre, 650, Route Des Lucioles, F-06921 Sophia-Antipolis CE, vol. RAN WG1, No. Athens, Greece, Feb. 25, 2019-Mar. 1, 2019, Feb. 16, 2019 (Feb. 16, 2019), XP051600685, 9 Pages.

\* cited by examiner

CONFIGURED GRANT OPERATION FOR NEW RADIO UNLICENSED SPECTRUM CARRIER AGGREGATION

This application claims the benefit of Indian Provisional Application Serial No. 201941007087, entitled "Configured Grant Operation for New Radio Unlicensed Spectrum Carrier Aggregation" and filed on Feb. 22, 2019, which is expressly incorporated by reference herein in its entirety.

BACKGROUND

Aspects of the present disclosure relate generally to communication systems, and more particularly, to a configured grant operation for new radio (NR) unlicensed spectrum (NR-U) carrier aggregation (CA).

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G NR technologies. 5G NR technologies are a part of a continuous mobile broadband evolution promulgated by Third Generation Partnership Project (3GPP) to meet new requirements associated with latency, reliability, security, scalability (e.g., with Internet of Things (IoT)), and other requirements. 5G NR technologies include services associated with enhanced mobile broadband (eMBB), massive machine type communications (mMTC), and ultra reliable low latency communications (URLLC). Some aspects of 5G NR technologies may be based on the 4G Long Term Evolution (LTE) standard.

In some cases, a user equipment (UE) waits to receive an explicit physical downlink control channel (PDCCH) (e.g., uplink (UL) grant) from a base station before transmitting UL data. However, due to low latency requirements and critical timing requirements in 5G NR technologies, the UE may need to transmit before receiving the UL grant from the base station. Further, the UE may not know which resources or carriers contain feedback in response to the UL data. Accordingly, there exists a need for further improvements in 5G NR technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of wireless communication by a user equipment (UE) is disclosed. The method may include transmitting uplink (UL) data to a base station according to a configured grant configuration. The method may also include determining a carrier to receive feedback from the base station based on the configured grant configuration. The method may further include receiving feedback from the base station on the carrier in response to the transmitting of the UL data.

In another aspect, a UE for wireless communication is disclosed. The UE may include a memory storing instructions, and a processor communicatively coupled to the memory. The processor may be configured to transmit UL data to a base station according to a configured grant configuration. The processor may also be configured to determine a carrier to receive feedback from the base station based on the configured grant configuration. The processor may also be configured to receive feedback from the base station on the carrier in response to the transmitting of the UL data.

In an aspect, a computer-readable medium storing computer executable code for wireless communication by a UE is disclosed. The computer-readable medium may include code to transmit UL data to a base station according to a configured grant configuration. The computer-readable medium may also include code to determine a carrier to receive feedback from the base station based on the configured grant configuration. The computer-readable medium may also include code to receive feedback from the base station on the carrier in response to the transmitting of the UL data.

In an aspect, an apparatus for wireless communication is disclosed. The apparatus may include means for transmitting UL data to a base station according to a configured grant configuration. The apparatus may also include means for determining a carrier to receive feedback from the base station based on the configured grant configuration. The apparatus may also include means for receiving feedback from the base station on the carrier in response to the transmitting of the UL data.

In an aspect, a method of wireless communication by a base station is disclosed. The method may include receiving UL data from a UE according to a configured grant configuration. The method may further include determining a carrier to transmit feedback to the UE based on the configured grant configuration. The method may also include transmitting the feedback to the UE on the carrier in response to the receiving of the UL data.

In another aspect, a base station for wireless communication is disclosed. The base station may include a memory storing instructions, and a processor communicatively coupled to the memory. The processor may be configured to receive UL data from a UE according to a configured grant configuration. The processor may also be configured to determine a carrier to transmit feedback to the UE based on the configured grant configuration. The processor may also be configured to transmit the feedback to the UE on the carrier in response to the receiving of the UL data.

In an aspect, a computer-readable medium storing computer executable code for wireless communication by a base station is disclosed. The computer-readable medium may include code to receive UL data from a UE according to a configured grant configuration. The computer-readable medium may also include code to determine a carrier to transmit feedback to the UE based on the configured grant configuration. The computer-readable medium may also include code to transmit the feedback to the UE on the carrier in response to the receiving of the UL data.

In an aspect, an apparatus for wireless communication is disclosed. The apparatus may include means for receiving UL data from a UE according to a configured grant configuration. The apparatus may also include means for determining a carrier to transmit feedback to the UE based on the configured grant configuration. The apparatus may also include means for transmitting the feedback to the UE on the carrier in response to the receiving of the UL data.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description, set forth below, in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

For configured grants in carrier aggregation mode, different sets of resources may be configured in different carriers. According to the present disclosure, options for configured grant-deficiency feedback indicator (CG-DFI) feedback, configured grant configuration, and activation/deactivation in carrier aggregation (CA) cases and/or licensed-assisted access (LAA) cases, are disclosed.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In an aspect, a configured grant mode refers to a mode in 5G NR technologies where some resources in an uplink (UL) are pre-configured for the user equipment (UE). The UE may refer to the configured grant mode for autonomous UL data transmission when the UE has data to transmit but has not received an explicit physical downlink control channel (PDCCH) (e.g., UL grant) for a specific resource.

For NR-unlicensed spectrum (NR-U), two modes of configuration may be supported by a configured grant mode. In a first mode (Type A), parameters of the UE may be configured by an upper protocol layer (e.g., radio resource control (RRC) layer). In a second mode (Type B), activation and deactivation and some parameter changes may be allowed via a downlink (DL) control information (DCI) signal.

For configured grant UL transmissions in unlicensed spectrums, a base station may send acknowledgment (ACK)/negative ACK (NACK) feedback in a DL. This may serve two purposes: first, for hybrid automatic repeat request (HARQ) processes configured for configured grants, ACK/NACK feedback may be provided to enable autonomous retransmission in configured grant resources; and second, for all HARQ processes, ACK/NACK feedback may be provided for contention window updates.

In unlicensed spectrums (e.g., 5 GHz), a base station may use an amount of bandwidth (BW) (e.g., 80 MHz) in a carrier aggregation (CA) mode (e.g., 4 carriers of 20 MHz each). CA operation may be beneficial as listen-before-talk (LBT) may be performed at a specific amount of units (e.g., units of 20 MHz) per regulation. In some aspects, base stations/UEs may gain access on some carriers but not others.

For configured grants in CA mode, different sets of resources may be configured in different carriers. According to the present disclosure, options for configured grant-DFI feedback, configured grant configuration, and activation/deactivation in CA cases and/or licensed-assisted access (LAA) cases, are disclosed.

In some aspects, different options may apply for CG-DFI feedback. For example, in a first option, the CG-DFI for a particular carrier is sent only on the DL resources of that carrier. In a second option, in an LAA case, the CG-DFI for a particular carrier is sent only on the DL resources of that carrier and/or licensed carrier. In a third option, in an LAA case, the CG-DFI is sent only on the licensed carrier. The third option may not occur as often as the first option and the second option but there may be benefits to offloading more to an unlicensed spectrum. In a fourth option, if there is a notion of primary carrier for subband LBT, the CG-DFI for all carriers may be sent only on a primary carrier. In a fifth option, if there is a notion of a primary carrier for subband LBT, the CG-DFI for all carriers may be sent only on a primary carrier or that carrier. In a sixth option, the CG-DFI for any carrier can be sent on any carrier.

In an aspect, the above options may be selected based on whether the UE is in a CA mode, a dual connectivity (DC) mode, or single standalone (SA) mode. In some aspects, the set of carriers to monitor for the CG-DFI may be indicated as part of the configured grant configuration. Further, similar options may also apply for activation/deactivation DCI.

In some aspects, some of the above-options may include adding a close-in reference short with frequency (CIF) field to indicate which carrier may be used. The following are options for the CG-DFI for multiple carriers. In option 1, there may be one DCI used for each carrier. In option 2, there may be different DCIs used for different subsets (e.g., one DCI for carrier 0 and 1 and another for carrier 2 and 3). In option 2, the subset may be fixed (e.g., RRC configured) or dynamic (e.g. DCI might indicate that the DCI applies to carriers 0 and 2 dynamically). Further, in option 2, the number/max number of subsets/set of subsets to include in a DCI may be fixed (e.g. RRC configured). For example, there may be feedback for at most two carriers. In an option 3, one common DCI may be used for all carriers.

In an aspect, DCI design may be as follows. In an option 1, the DCI may always be sized for all carriers. For example, a number of HARQ processes may be a total of number of HARQ processes across each component carrier. In an option 2, a bitmap or other indication can indicate the set of component carriers that the DCI applies to (this is within the subset of carriers that the DCI is designed for). The remaining bits in the DCI may be distributed across HARQ processes accordingly. For example if the DCI has 36 bits, a 4 bit bitmap indicates which carriers the DCI applies to. In an example, the DCI may apply to 8 HARQ processes per carrier.

In some examples, if only one carrier is enabled in DCI, there may be 4 bits per HARQ process for feedback (e.g., code block group (CBG) level ACK/NACK). In some examples, if two carriers are configured, there may be 2 bits per HARQ process per carrier for CBG level ACK/NACK feedback. In some examples, if all 4 carriers are configured, we may have transport block (TB) level HARQ ACK feedback. In an option 3, joint coding of TB level/CBG level for different carriers/HARQ process may be done where some TBs may be sent with a TB level ACK, while others may be sent with a CBG level ACK.

In some aspects, configured grant activation/deactivation for a DCI may be as follows. Similar techniques/flexibility discussed for CG-DFI feedback may also be used for configured grant activation DCI and deactivation DCI (release DCI) that are used in Type B configured grant. In some examples, options for activation/deactivation across carriers may include: independent activation/deactivation on each carrier; activation/deactivation may always be performed for all carriers together, or as a sub-option, unlicensed only or unlicensed and licensed; or the option used for activation and deactivation may be different. For example, activation may be independent per carrier but deactivation may be common for all carriers. In this aspect, DCI design details may include: a common DCI for all carriers and in some examples, unlicensed carrier only or unlicensed and licensed carriers may apply. Further, carrier indication bitmap may be introduced to indicate which of the carriers are activated/deactivated instead of a CIF. In some examples, with carrier indication bitmap, when different parameters are desired for different carriers, multiple DCIs may be sent for different carriers with different parameters. When parameters are common the same DCI may be used and the bitmap may be set for the multiple carriers. Thus this provides full flexibility while still helping reduced overhead in cases such as when parameters are common. In some examples, specific fields across carriers may also be common but some fields might be per carrier. For example, the MCS may be common across carriers but we may want resource allocation to be per carrier. Joint coding may be done for the fields across carriers. For example, only certain combinations of resource allocations may be allowed across different carriers. This may allow reusing the common DCI for multiple carriers even when some parameters across carriers are different at expense of DCI size being possibly larger. In some aspects, an independent DCI for each carrier may be used. Some of the unused fields in the activation/deactivation DCI that are hardcoded may be used to indicate carrier specific information or which carriers the activation/deactivation DCI applies to. Accordingly, a DCI may not require an increase in size.

In an aspect, configuration of a configured grant across carriers may include different techniques. For example, RRC configuration may be common for all carriers or done independently per carrier. Configuration of a configured grant may use the different options provided above. Time domain resources may be the same across carriers or independently configured. Some resources may improve simultaneous access across carriers. This may also apply to sub-symbol start offset computation across carriers. Some parameters, such as modulation and coding scheme (MCS), CG HARQ processes etc., may be the same across carriers, some may be different across carriers, but combinations across carriers might be limited (e.g., frequency domain resource allocation (FDRA)), while some parameters across carriers may be completely independent.

In an aspect, the subbands in a bandwidth part (BWP) may be applied similar to carriers, as described above. For example, although the ideas described previously are in context of multiple carriers, similar ideas may also apply to subbands (which have independent LBT) within a wideband BWP that covers multiple subbands. In some examples, resources may be configured across subbands and a UE may select the subband to use for transmission of a configured grant based on an LBT outcome. In some examples, a UE may be limited to transmit on only one subband or may be allowed to transmit on more than one subband. In some examples, a UE may transmit different HARQ identifications (IDs) on different subbands or on a same TB rate matched across all subbands.

In an aspect, the configuration across subbands may be treated as independent configurations or may be a common configuration. Similarly activation/deactivation/DFI may be common or independent. For example, HARQ IDs across different subbands may be different or common. In another example, FDRAs across subbands may be obtained by repeating the resource allocation on one subband with a subband specific offset. In some examples, instead of using bitmap based indication, subbands may use a start subband or a number of subbands type indication to reduce DCI overhead. For example, a UE may only use contiguous subbands for transmission and hence DFI feedback may also be restricted to only be for contiguous subbands.

Turning now to the figures, examples of systems and methods for configured grant operations are depicted. It is to be understood that aspects of the figures may not be drawn to scale and are instead drawn for illustrative purposes.

Figure 1:
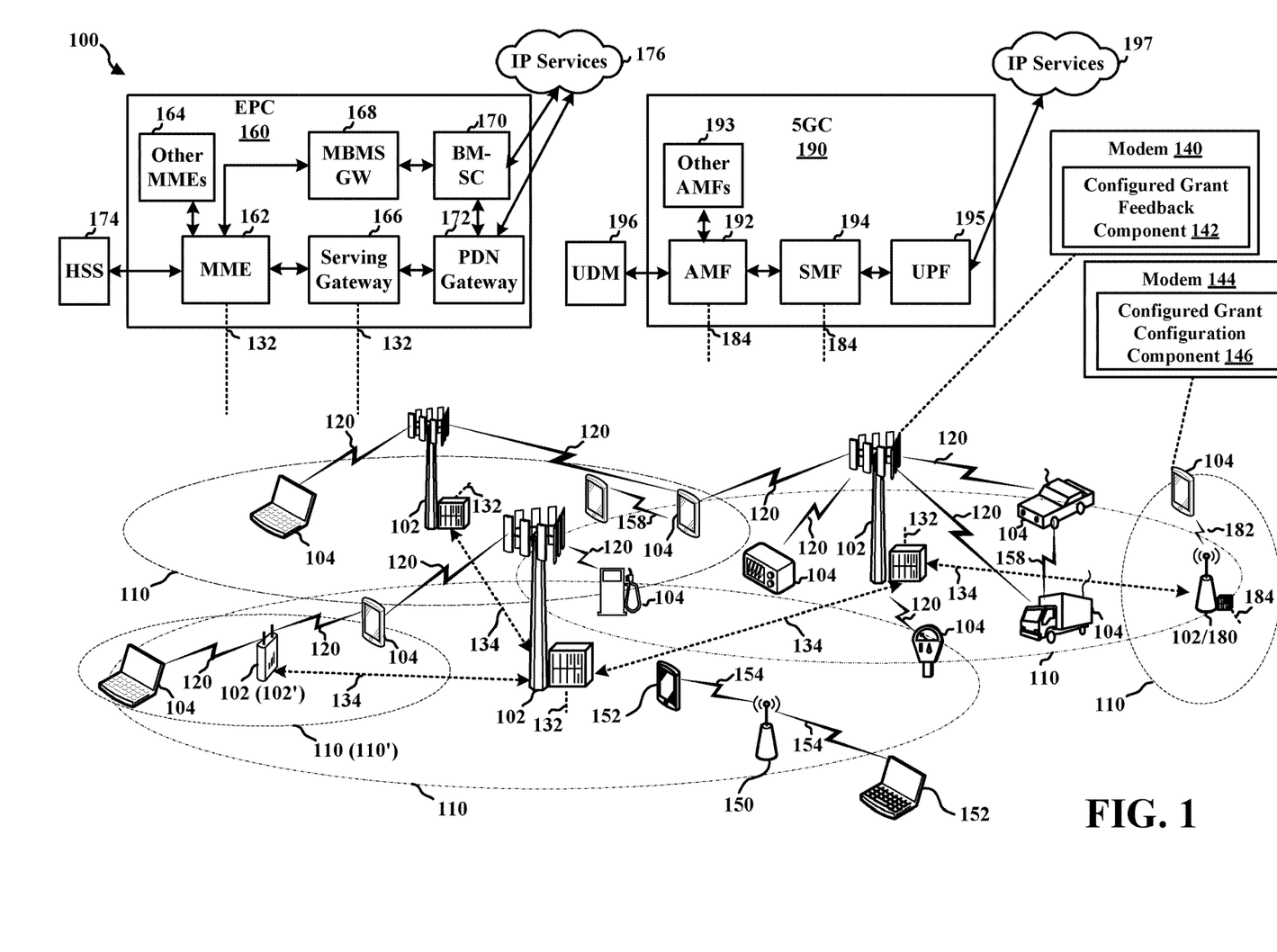
FIG. 1 is a schematic diagram of an example of a wireless communications system and an access network according to aspects of the present disclosure.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190.

The base station 102 may include a modem 140 having a configured grant feedback component 142 that may be configured to receive UL data from a UE according to a configured grant configuration, determine a carrier to transmit feedback from the base station based on the configured grant configuration, and transmit feedback to the UE on the carrier in response to the receiving of the UL data.

The UE 104 may include a modem 144 having a configured grant configuration component 146 that may be configured to transmit UL data to a base station according to a configured grant configuration, determine a carrier to receive feedback from the base station based on the configured grant configuration, and receive feedback from the base station on the carrier in response to the transmitting of the UL data.

In an aspect, the base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 and 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
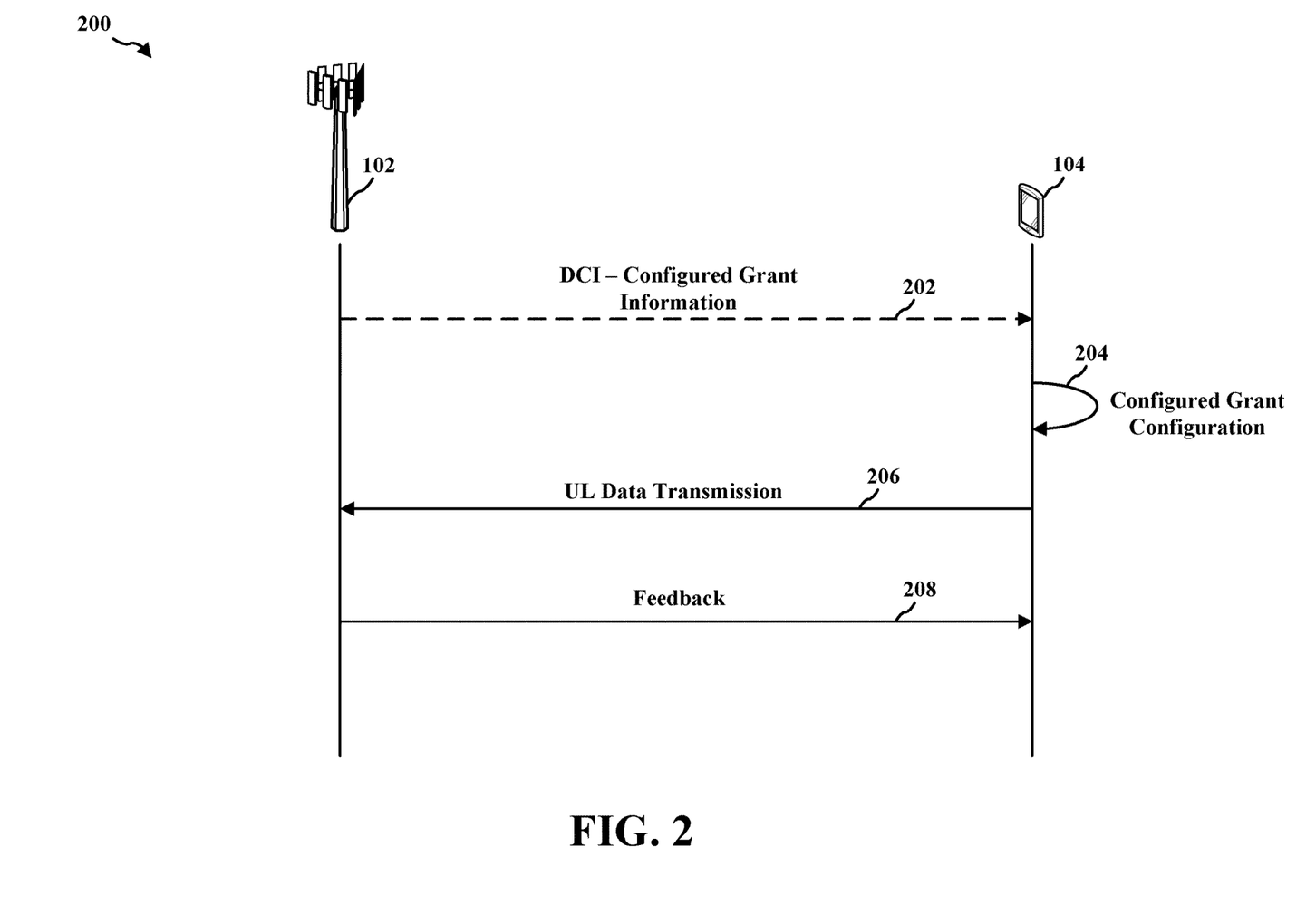
FIG. 2 is an example of communications between a user equipment (UE) and a base station of FIG. 1, according to aspects of the present disclosure.

Referring to FIG. 2, an example diagram 200 of communications between the base station 102 and the UE 104 is disclosed. In an example, the base station 102 may optionally transmit a DCI to the UE 104, at 202. The DCI may include configured grant configuration parameters for the UE 104 to use. In an example, the parameters may include an indication of one or more carriers for the UE 104 to monitor for receiving feedback from the base station 102. At 204, the UE may be configured according to a configured grant configuration. In an example, the configured grant configuration may be received from an upper protocol layer (e.g., RRC layer) of the UE or from the DCI transmitted by the base station 102. In an aspect, the configured grant configuration may be based on whether the UE is in a CA mode, a dual connectivity (DC) mode, or single standalone (SA) mode. In another example, the configured grant configuration may indicate a set of carriers for the UE 104 to monitor for feedback (e.g., CG-DFI feedback). Based on the configured grant configuration, the UE 104, at 206, may transmit UL data to the base station 102, without having received a UL grant from the base station 102. In response to receiving the UL data, the base station 102 may transmit feedback, at 208, to the UE 104. In an example, the feedback may include ACK/NACK of the UL data. Further, based on the configured grant configuration, the UE 104 may monitor one or more carriers to determine one or more carriers to monitor to receive the feedback.

Figure 3:
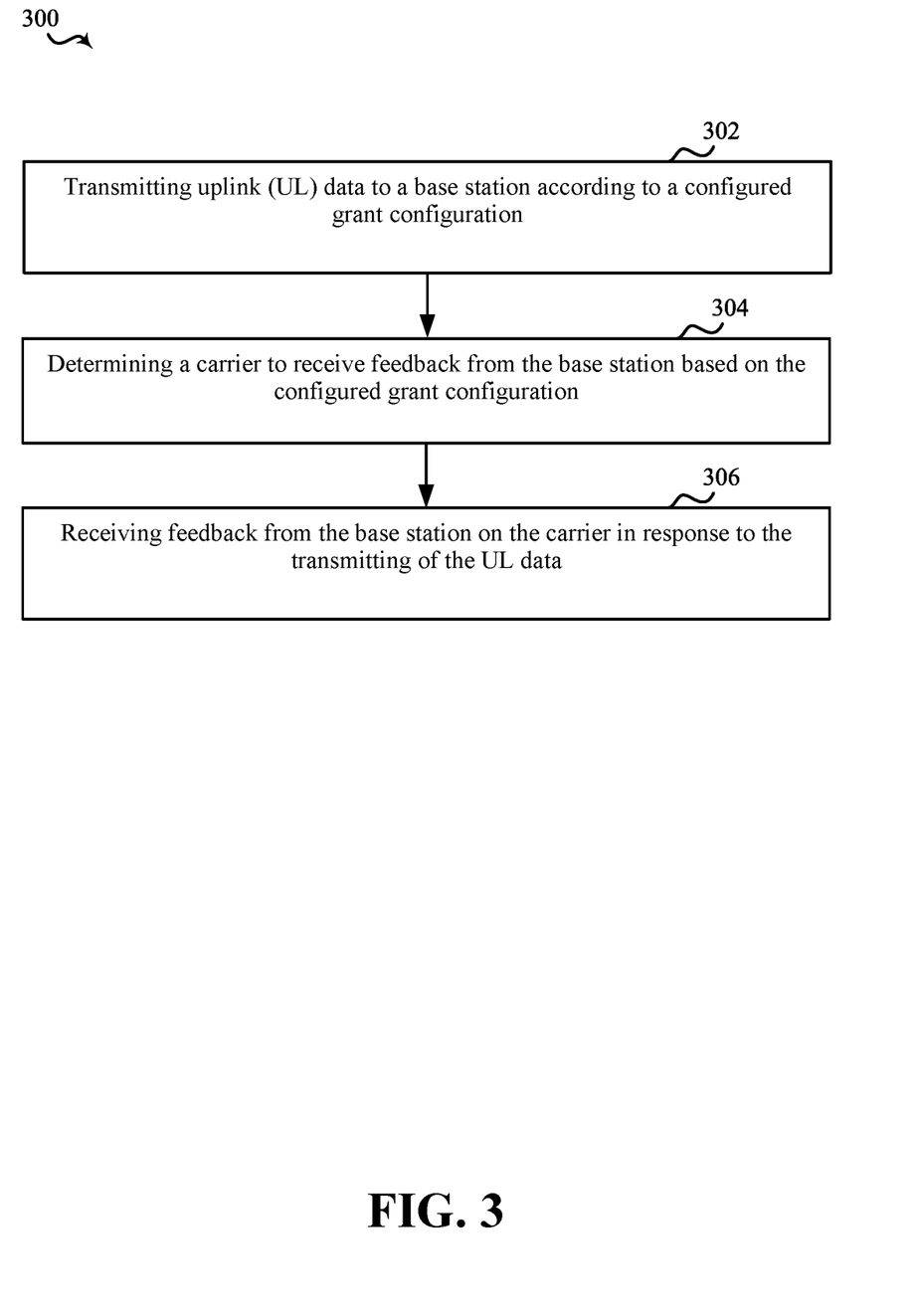
FIG. 3 is a flowchart of an example of a method of wireless communications by a UE, according to aspects of the present disclosure.

Referring to FIG. 3, an example of a method 300 of wireless communications is disclosed. The method 300 may be performed by the UE 104 of FIG. 1 along with any of the components of the UE 104. For example, the method 300 may be performed by one or more of the a processor 412, a transceiver 402, the modem 144, or the configured grant configuration component 146.

At 302, the method 300 may include transmitting UL data to a base station according to a configured grant configuration. For example, one or more of the processor 412, the transceiver 402, the modem 144, or the configured grant configuration component 146 of the UE 104 may be configured to transmit UL data to the base station 102 according to a configured grant configuration. Thus, one or more of the processor 412, the transceiver 402, the modem 144, the configured grant configuration component 146, and/or one or more other components/subcomponents of the UE 104 may define the means for transmitting UL data to the base station 102 according to a configured grant configuration. In an example, the UL data may be transmitted to the base station 102 without the UE 104 having received a UL grant. In some examples, the configured grant configuration is received from an upper protocol layer of the UE 104 or from the base station 102 via a DCI signal.

At 304, the method 300 may include determining a carrier to receive feedback from the base station based on the configured grant configuration. For example, one or more of the processor 412, the transceiver 402, the modem 144, or the configured grant configuration component 146 of the UE 104 may be configured to determine a carrier to receive feedback (e.g., feedback at 208) from the base station 102 based on the configured grant configuration. Thus, one or more of the processor 412, the transceiver 402, the modem 144, the configured grant configuration component 146, and/or one or more other components/subcomponents of the UE 104 may define the means for determining a carrier to receive feedback (e.g., feedback at 208) from the base station 102 based on the configured grant configuration. In some examples, the carrier to receive the feedback may be determined to be one or more of a same carrier as a carrier used to transmit the UL data or a licensed carrier. In some examples, the carrier to receive the feedback may be determined to be one or more of a same carrier as a carrier used to transmit the UL data or a primary carrier for a subband listen-before-talk (LBT). In some examples, the carrier to receive the feedback may be determined to be one or more of any carrier corresponding to the base station 102. In some examples, the carrier to receive the feedback may be determined based on one or more of a carrier aggregation mode, a dual connectivity mode, or a standalone mode. In some examples, the carrier to receive the feedback may be determined based on a set of carriers identified by the configured grant configuration.

At 306, the method 300 may include receiving feedback from the base station on the carrier in response to the transmitting of the UL data. For example, one or more of the processor 412, the transceiver 402, the modem 144, or the configured grant configuration component 146 of the UE 104 may be configured to receive feedback from the base station 102 on the carrier in response to the transmitting of the UL data. Thus, one or more of the processor 412, the transceiver 402, the modem 144, the configured grant configuration component 146, and/or one or more other components/subcomponents of the UE 104 may define the means for receiving feedback from the base station 102 on the carrier in response to the transmitting of the UL data. For example, the UE 104 may monitor one or more carriers to receive the feedback from the base station 102. In an example, the feedback may include ACK/NACK feedback and/or CG-DFI feedback.

Figure 4:
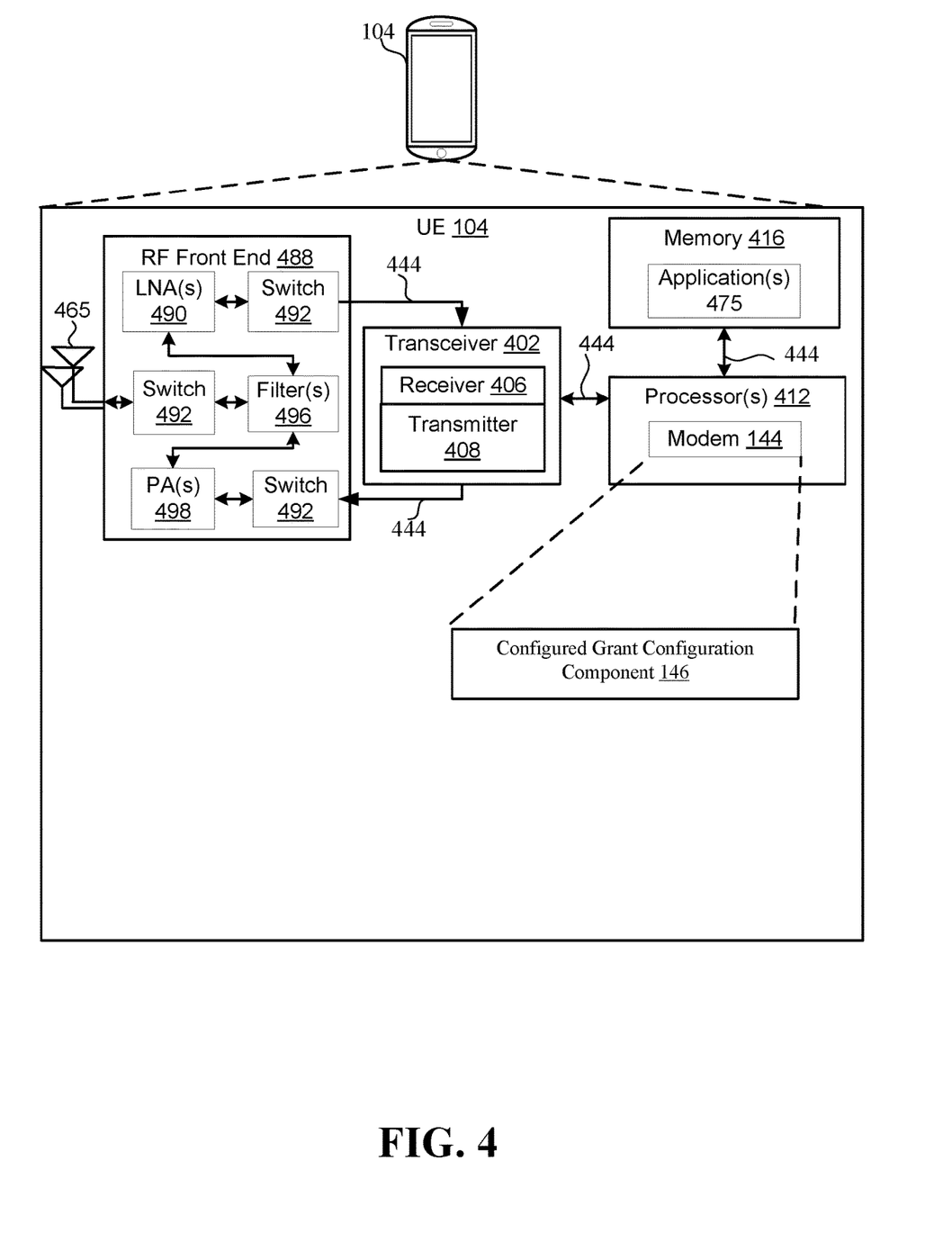
FIG. 4 is a schematic diagram of an example of the UE of FIG. 1, according to aspects of the present disclosure.

Referring to FIG. 4, one example of an implementation of the UE 104 may include a variety of components, some of which have already been described above, but including components such as one or more processors 412, memory 416, and transceiver 402 in communication via one or more buses 444, which may operate in conjunction with a modem 144 to enable one or more of the functions of the method 300 described herein. The one or more processors 412, modem 140, memory 416, transceiver 402, RF front end 488 and one or more antennas 465, may be configured to support voice and/or data calls (simultaneously or non-simultaneously) in one or more radio access technologies.

In an aspect, the one or more processors 412 may include the modem 144 that uses one or more modem processors. The various functions related to the configured grant configuration component 146 may be included in the modem 144 and/or the processors 412 and, in an aspect, may be executed by a single processor, while in other aspects, different ones of the functions may be executed by a combination of two or more different processors. For example, in an aspect, the one or more processors 412 may include any one or any combination of a modem processor, or a baseband processor, or a digital signal processor, or a transmit processor, or a receiver processor, or a transceiver processor associated with the transceiver 402. In other aspects, some of the features of the one or more processors 412 and/or the modem 144 may be performed by the transceiver 402.

Also, the memory 416 may be configured to store data used herein and/or local versions of applications 475 or the configured grant configuration component 146 and/or one or more of its subcomponents being executed by the at least one processors 412. The memory 416 may include any type of computer-readable medium usable by a computer or the at least one processor 412, such as random access memory (RAM), read only memory (ROM), tapes, magnetic discs, optical discs, volatile memory, non-volatile memory, and any combination thereof. In an aspect, for example, the memory 416 may be a non-transitory computer-readable storage medium that stores one or more computer-executable codes defining the configured grant configuration component 146 and/or one or more of its subcomponents, and/or data associated therewith, when the UE 104 is operating the at least one processor 412 to execute the configured grant configuration component 146 and/or one or more of its subcomponents.

The transceiver 402 may include at least one receiver 406 and at least one transmitter 408. The receiver 406 may include hardware, firmware, and/or software code executable by a processor for receiving data, the code comprising instructions and being stored in a memory (e.g., computer-readable medium). The receiver 406 may be, for example, a radio frequency (RF) receiver. In an aspect, the receiver 406 may receive signals transmitted by at least one of the base stations 102. Additionally, the receiver 406 may process such received signals, and also may obtain measurements of the signals, such as, but not limited to, Ec/Io, SNR, RSRP, RSSI, etc. The transmitter 408 may include hardware, firmware, and/or software code executable by a processor for transmitting data, the code comprising instructions and being stored in a memory (e.g., computer-readable medium). A suitable example of the transmitter 408 may include, but is not limited to, an RF transmitter. The transceiver 402, receiver 406, and/or transmitter 408 may be configured to operate in mmW frequencies and/or near mmW frequencies.

Moreover, in an aspect, the UE 104 may include the RF front end 488, which may operate in communication with one or more antennas 465 and the transceiver 402 for receiving and transmitting radio transmissions, for example, wireless communications transmitted by at least one of the base stations 102 or wireless transmissions transmitted by the UE 104. The RF front end 488 may be connected to the one or more antennas 465 and may include one or more low-noise amplifiers (LNAs) 490, one or more switches 492, one or more power amplifiers (PAs) 498, and one or more filters 496 for transmitting and receiving RF signals.

In an aspect, the LNA 490 may amplify a received signal at a desired output level. In an aspect, each of the LNAs 490 may have a specified minimum and maximum gain values. In an aspect, the RF front end 488 may use the one or more switches 492 to select a particular LNA 490 and its specified gain value based on a desired gain value for a particular application.

The one or more PA(s) 498 may be used by the RF front end 488 to amplify a signal for an RF output at a desired output power level. In an aspect, each of the PAs 498 may have specified minimum and maximum gain values. In an aspect, the RF front end 488 may use the one or more switches 492 to select a particular PA 498 and its specified gain value based on a desired gain value for a particular application.

Also, for example, the one or more filters 496 may be used by the RF front end 488 to filter a received signal to obtain an input RF signal. Similarly, in an aspect, for example, a respective filter 496 may be used to filter an output from a respective PA 498 to produce an output signal for transmission. In an aspect, each of the filters 496 may be connected to a specific LNA 490 and/or PA 498. In an aspect, the RF front end 488 may use the one or more switches 492 to select a transmit or receive path using a specified filter 496, LNA 490, and/or PA 498, based on a configuration as specified by the transceiver 402 and/or processor 412.

As such, the transceiver 402 may be configured to transmit and receive wireless signals through the one or more antennas 465 via the RF front end 488. In an aspect, the transceiver 402 may be tuned to operate at specified frequencies such that the UE 104 may communicate with, for example, one or more of the base stations 102 or one or more cells associated with one or more of the base stations 102. In an aspect, for example, the modem 144 may configure the transceiver 402 to operate at a specified frequency and power level based on the UE configuration of the UE 104 and the communication protocol used by the modem 144.

In an aspect, the modem 144 may be a multiband-multimode modem, which may process digital data and communicate with the transceiver 402 such that the digital data is sent and received using the transceiver 402. In an aspect, the modem 144 may be multiband and be configured to support multiple frequency bands for a specific communications protocol. In an aspect, the modem 144 may be multimode and be configured to support multiple operating networks and communications protocols. In an aspect, the modem 144 may control one or more components of the UE 104 (e.g., RF front end 488, transceiver 402) to enable transmission and/or reception of signals from the network based on a specified modem configuration. In an aspect, the modem configuration may be based on the mode of the modem 144 and the frequency band in use. In another aspect, the modem configuration may be based on UE configuration information associated with the UE 104 as provided by the network during cell selection and/or cell reselection.

Figure 5:
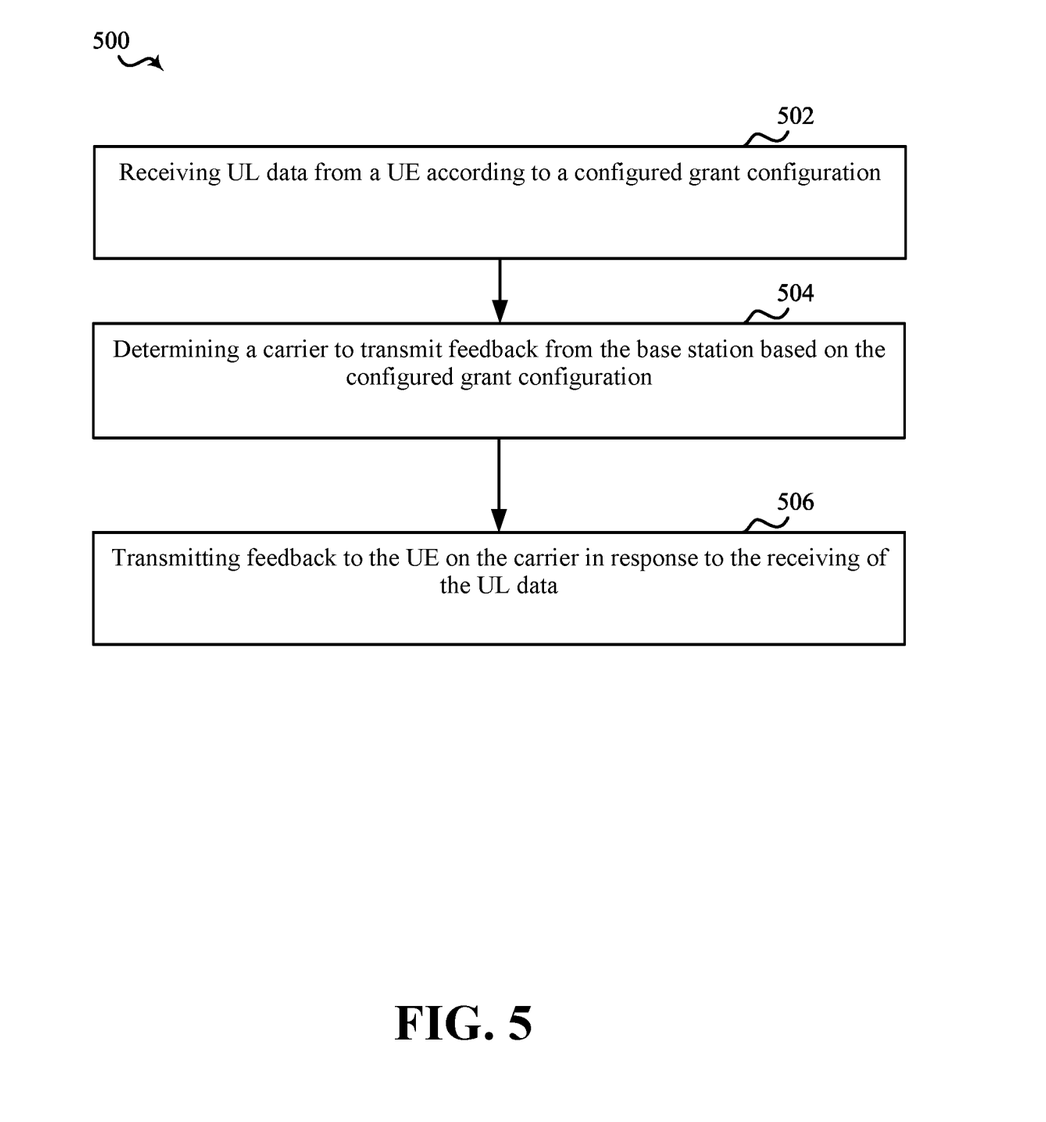
FIG. 5 is a flowchart of an example of a method of wireless communications by a base station, according to aspects of the present disclosure.

Referring to FIG. 5, an example of a method 500 of wireless communications is disclosed. The method 500 may be performed by the base station 102 of FIG. 1 along with any of the components of the base station 102. For example, the method 500 may be performed by one or more of the a processor 612, a transceiver 602, the modem 140, or the configured grant feedback component 142.

At 502, the method 500 may include receiving UL data from a UE according to a configured grant configuration. For example, one or more of the processor 612, the transceiver 602, the modem 140, or the configured grant feedback component 142 may receive UL data from the UE 104 according to a configured grant configuration. Thus, one or more of the processor 612, the transceiver 602, the modem 140, the configured grant feedback component 142, and/or one or more other components/subcomponents of the base station 102 may define the means for receiving UL data from a UE 104 according to a configured grant configuration.

At 504, the method 500 may include determining a carrier to transmit feedback to the UE based on the configured grant configuration. For example, one or more of the processor 612, the transceiver 602, the modem 140, or the configured grant feedback component 142 may determine a carrier to transmit feedback to the UE 104 based on the configured grant configuration. Thus, one or more of the processor 612, the transceiver 602, the modem 140, the configured grant feedback component 142, and/or one or more other components/subcomponents of the base station 102 may define the means for determining a carrier to transmit feedback to the UE 104 based on the configured grant configuration. In some examples, the carrier to transmit the feedback may be determined to be one or more of a same carrier as a carrier used to receive the UL data or a licensed carrier. In some examples, the carrier to transmit the feedback may be determined to be one or more of a same carrier as a carrier used to receive the UL data or a primary carrier for a subband listen-before-talk (LBT). In some examples, the carrier to transmit the feedback may be determined to be one or more of any carrier corresponding to the base station 102. In some examples, the carrier to transmit the feedback may be determined based on one or more of a carrier aggregation mode, a dual connectivity mode, or a standalone mode. In some examples, the carrier to transmit the feedback may be determined based on a set of carriers identified by the configured grant configuration.

At 506, the method 500 may also include transmitting feedback to the UE on the carrier in response to the receiving of the UL data. For example, one or more of the processor 612, the transceiver 602, the modem 140, or the configured grant feedback component 142 may transmit the feedback to the UE 104 on the carrier in response to the receiving of the UL data. Thus, one or more of the processor 612, the transceiver 602, the modem 140, the configured grant feedback component 142, and/or one or more other components/subcomponents of the base station 102 may define the means for transmitting the feedback to the UE 104 on the carrier in response to the receiving of the UL data. In an example, the feedback may include ACK/NACK feedback and/or CG-DFI feedback.

In some aspects, the configured grant configuration may be transmitted to the UE 104 from the base station 102 via a DCI signal.

Figure 6:
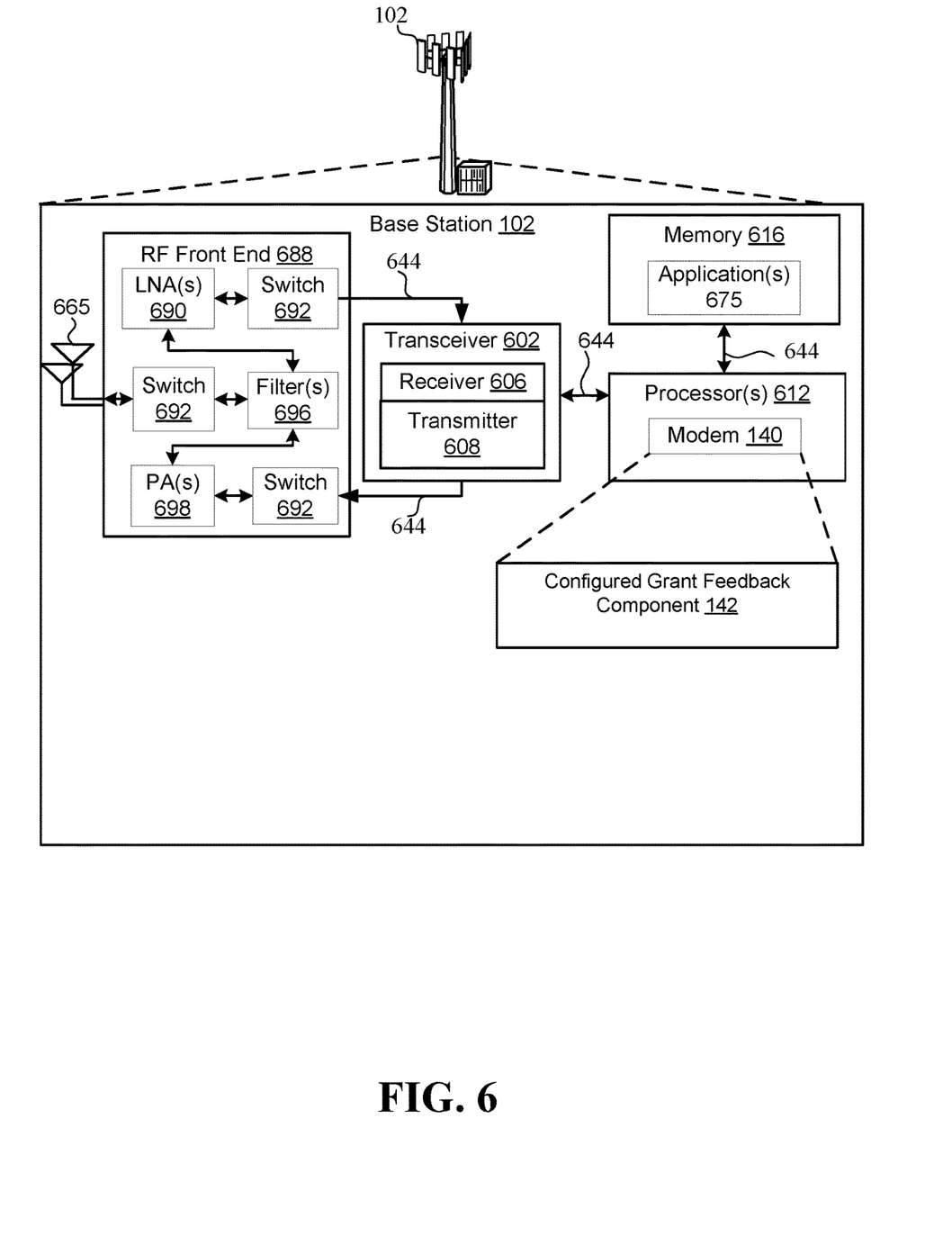
FIG. 6 is a schematic diagram of an example of the base station of FIG. 1, according to aspects of the present disclosure.

Referring to FIG. 6, one example of an implementation of base station 102 may include a variety of components, some of which have already been described above, but including components such as one or more processors 612, memory 616 and transceiver 602 in communication via one or more buses 644, which may operate in conjunction with modem 140 and the configured grant feedback component 142 to enable one or more of the functions of the method 500 described herein.

The transceiver 602, receiver 606, transmitter 608, one or more processors 612, memory 616, applications 675, buses 644, RF front end 688, LNAs 690, switches 692, filters 696, PAs 698, and one or more antennas 665 may be the same as or similar to the corresponding components of the UE 104, as described above, but configured or otherwise programmed for base station operations as opposed to UE operations.

Further Example Embodiments

An example method of wireless communication by a UE, comprising: transmitting uplink (UL) data to a base station according to a configured grant configuration; determining a carrier to receive feedback from the base station based on the configured grant configuration; and receiving feedback from the base station on the carrier in response to the transmitting of the UL data.

The above example method, wherein the configured grant configuration is received from an upper protocol layer of the UE or from the base station via a downlink (DL) control indicator (DCI) signal.

One or more of the above example methods, wherein the feedback is configured grant-deficiency feedback indicator (CG-DFI) feedback.

One or more of the above example methods, wherein the determining of the carrier to receive the feedback comprises: determining the carrier to receive the feedback to be one or more of a same carrier as a carrier used to transmit the UL data or a licensed carrier.

One or more of the above example methods, wherein the determining of the carrier to receive the feedback comprises: determining the carrier to receive the feedback to be one or more of a same carrier as a carrier used to transmit the UL data or a primary carrier for a subband listen-before-talk (LBT).

One or more of the above example methods, wherein the determining of the carrier to receive the feedback comprises: determining the carrier to receive the feedback to be one or more of any carrier corresponding to the base station.

One or more of the above example methods, wherein the determining of the carrier to receive the feedback is based on one or more of a carrier aggregation mode, a dual connectivity mode, or a standalone mode.

One or more of the above example methods, wherein the determining of the carrier to receive the feedback is based on a set of carriers identified by the configured grant configuration.

One or more of the above example methods, wherein the feedback is received from the base station via a downlink (DL) control indicator (DCI) signal.

One or more of the above example methods, wherein the DCI signal is received in any one of a plurality of carriers, including the carrier to receive the feedback.

One or more of the above example methods, wherein the DCI signal is received in any one of a subset of a plurality of carriers, including the carrier to receive the feedback.

One or more of the above example methods, wherein the DCI signal is received in one carrier of a plurality of carriers, wherein the one carrier is the carrier to receive the feedback.

One or more of the above example methods, wherein the feedback is configured grant-deficiency feedback indicator (CG-DFI) feedback and indicates activation/deactivation of a configured grant.

One or more of the above example methods, wherein the activation/deactivation of the configured grant is on a per carrier basis.

One or more of the above example methods, wherein the activation/deactivation of the configured grant is for each of a plurality of carriers.

One or more of the above example methods, wherein an activation of the configured grant based on one of a per carrier basis or for each of a plurality of carriers, and a deactivation of the configured grant is based on an opposite basis than the activation of the configured grant.

A second example method of wireless communication by a base station, comprising: receiving uplink (UL) data from a user equipment (UE) according to a configured grant configuration; determining a carrier to transmit feedback to the UE based on the configured grant configuration; and transmitting the feedback to the UE on the carrier in response to the receiving of the UL data.

The above second example method, wherein the configured grant configuration is received from an upper protocol layer.

One or more of the above second example methods, wherein the feedback is configured grant-deficiency feedback indicator (CG-DFI) feedback.

One or more of the above second example methods, wherein the determining of the carrier to transmit the feedback comprises: determining the carrier to transmit the feedback to be one or more of a same carrier as a carrier used to receive the UL data or a licensed carrier.

One or more of the above second example methods, wherein the determining of the carrier to transmit the feedback comprises: determining the carrier to transmit the feedback to be one or more of a same carrier as a carrier used to receive the UL data or a primary carrier for a subband listen-before-talk (LBT).

One or more of the above second example methods, wherein the determining of the carrier to transmit the feedback comprises: determining the carrier to transmit the feedback to be one or more of any carrier corresponding to the base station.

One or more of the above second example methods, wherein the determining of the carrier to transmit the feedback is based on one or more of a carrier aggregation mode, a dual connectivity mode, or a standalone mode.

One or more of the above second example methods, wherein the determining of the carrier to transmit the feedback is based on a set of carriers identified by the configured grant configuration.

One or more of the above second example methods, wherein the feedback is transmitted to the UE via a downlink (DL) control indicator (DCI) signal.

One or more of the above second example methods, wherein the DCI signal is transmitted in any one of a plurality of carriers, including the carrier to transmit the feedback.

One or more of the above second example methods, wherein the DCI signal is transmitted in any one of a subset of a plurality of carriers, including the carrier to transmit the feedback.

One or more of the above second example methods, wherein the DCI signal is transmitted in one carrier of a plurality of carriers, wherein the one carrier is the carrier to transmit the feedback.

One or more of the above second example methods, wherein the feedback is configured grant-deficiency feedback indicator (CG-DFI) feedback and indicates activation/deactivation of a configured grant.

One or more of the above second example methods, wherein the activation/deactivation of the configured grant is on a per carrier basis.

One or more of the above second example methods, wherein the activation/deactivation of the configured grant is for each of a plurality of carriers.

One or more of the above second example methods, wherein an activation of the configured grant based on one of a per carrier basis or for each of a plurality of carriers, and a deactivation of the configured grant is based on an opposite basis than the activation of the configured grant.

An example apparatus for wireless communication, comprising: a memory; and at least one processor coupled to the memory and configured to perform any one or more of the first example methods or the second example methods above.

An example computer-readable medium storing computer executable code, comprising: code to perform any one or more of the first example methods or the second example methods above.

An example apparatus, comprising: means for performing any one or more of the first example methods or the second example methods above.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication by a user equipment (UE), comprising:
    receiving, from a base station, a configured grant configuration for a carrier aggregation mode, the configuration grant configuration configuring the UE for autonomous UL data transmissions over multiple carriers, without an explicit UL grant;
    transmitting uplink (UL) data over resources with the multiple carriers according to the configured grant configuration; and
    receiving downlink (DL) control information (DCI) on resources associated with a carrier of the multiple carriers, the DCI comprising feedback for the UL data, via a first option where the feedback is for the carrier or via a second option where the feedback is for a second carrier of the multiple carriers,
via the first option or via the second option being based on a field in the DCI.

2. The method of claim 1, wherein
the carrier to receive the feedback includes the at least one carrier in an unlicensed frequency spectrum used in the transmitting of the UL data.

3. The method of claim 1, wherein
the carrier to receive the feedback includes a licensed carrier in a licensed frequency spectrum.

4. The method of claim 1, wherein
the carrier to receive the feedback includes a primary carrier for a subband listen-before-talk (LBT).

5. The method of claim 1, wherein
the carrier to receive the feedback includes one or more of any carrier corresponding to the base station.

6. The method of claim 1, the first or the second option being further based on the configured grant configuration.

7. A user equipment (UE), comprising:
a memory storing instructions; and
one or more processors communicatively coupled with the memory and configured to:
  receive, from a base station, a configured grant configuration for a carrier aggregation mode, the configuration grant configuration configuring the UE for autonomous UL data transmissions over multiple carriers, without an explicit UL grant;
  transmit uplink (UL) data over resources associated with the multiple carriers according to the configured grant configuration; and
  receive downlink (DL) control information (DCI) on resources associated with a carrier of the multiple carriers, the DCI comprising feedback for the UL data, via a first option where the feedback is for the carrier or via a second option where the feedback is for a second carrier of the multiple carriers,
via the first option or via the second option being based on a field in the DCI.

8. The UE of claim 7, the first or the second option being further based on the configured grant configuration.

9. The UE of claim 7, wherein
the carrier to receive the feedback includes the at least one carrier in an unlicensed frequency spectrum used by the processor to transmit the UL data.

10. The UE of claim 7, wherein
the carrier to receive the feedback includes a licensed carrier in a licensed frequency spectrum.

11. The UE of claim 7, wherein
the carrier to receive the feedback includes a subband listen-before-talk (LBT).

12. The UE of claim 7, wherein
the carrier to receive the feedback includes one or more of any carrier corresponding to the base station.

13. A base station, comprising:
a memory storing instructions; and
one or more processors communicatively coupled with the memory and configured to:
  transmit, to a user equipment (UE), a configured grant configuration for a carrier aggregation mode, the configured grant configuration configuring the UE for autonomous UL data transmissions over multiple carriers, without an explicit UL grant;
  receive uplink (UL) data from the UE over resources associated with the multiple carriers according to the configuration grant configuration; and
  transmit downlink (DL) control information (DCI) to the UE on resources associated with a carrier of the multiple carriers, the DCI comprising feedback for the UL data, via a first option where the feedback is for the carrier or via a second option where the feedback is for a second carrier of the multiple carriers,
via the first option or via the second option being indicated by a field of the DCI.

14. The base station of claim 13, the first or the second option being further based on the configured grant configuration.

15. The base station of claim 13, wherein
the carrier to transmit the feedback includes the at least one carrier in an unlicensed frequency spectrum used by the processor to receive the UL data.

16. The base station of claim 13, wherein the carrier to transmit the feedback includes a licensed carrier in a licensed frequency spectrum.

17. The base station of claim 13, wherein
the carrier to transmit the feedback includes a primary carrier for a subband listen-before-talk (LBT).

18. The base station of claim 13, wherein
the carrier to transmit the feedback includes one or more of any carrier corresponding to the base station.

* * * * *